(No Model.)

J. PUSEY.
HOSE CARRIAGE.

No. 271,738.  Patented Feb. 6, 1883

WITNESSES:
John Burkhardt.
Wm. H. Carson.

INVENTOR.
Joshua Pusey.

UNITED STATES PATENT OFFICE.

JOSHUA PUSEY, OF PHILADELPHIA, PENNSYLVANIA.

HOSE-CARRIAGE.

SPECIFICATION forming part of Letters Patent No. 271,738, dated February 6, 1883.

Application filed August 9, 1882. (No model.)

*To all whom it may concern:*

Be it known that I, JOSHUA PUSEY, a citizen of the United States, residing at the city and county of Philadelphia, State of Pennsylvania, have invented a new and useful Improvement in Hose-Carriages, of which the following is a specification, reference being had to the accompanying drawings, of which—

Figures 1, 2:
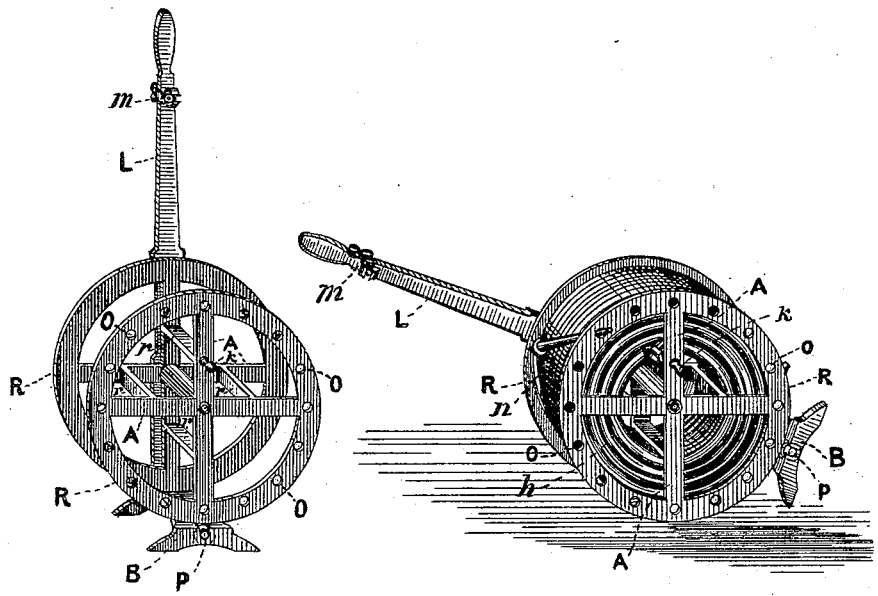
Figure 3:
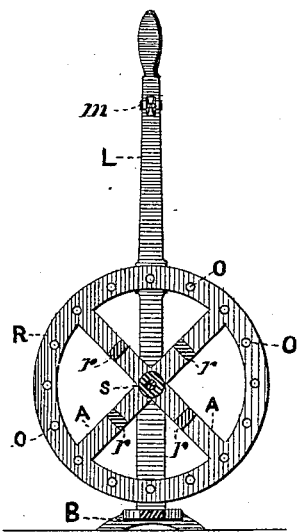
Figure 4:
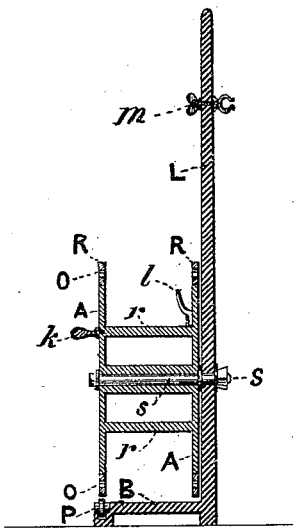

Figure 1 is a perspective view, showing the reel supported free from the ground in position for winding the hose thereon. Fig. 2 is a similar perspective view, showing the rims or wheels of the reel resting upon the ground, the hose being wound upon and its ends secured to the reel and the device in position to be propelled from place to place. Fig. 3 is a longitudinal vertical section of Fig. 1. Fig. 4 is a transverse vertical section of the same.

The nature of this invention is a hose-carriage consisting of a reel with circular rims pivoted on a lever or standard provided with a supporting-base, whereby when the lever is in one position—that is, its base resting upon the ground—the reel will stand free to be rotated on its axis in order to allow the hose to be wound upon or unwound from the same, and when the lever and base are brought into another position the rims of the reel will rest upon the ground and the base be freed from contact with the latter, whereby the device (with the hose secured thereon) may be wheeled from place to place.

In the drawings (wherein like letters of reference, where they occur, indicate like parts) the reel, which is constructed as are ordinary hose-reels, except that it is always provided with circular rims R, secured to the arms or spokes A, turns loosely upon a stud, S, which projects horizontally from the side of the lever or standard L. This lever extends any desired distance beyond the reel, and is provided with a broad supporting-base, B. The rims R do not touch the latter, so that when the device is in the position shown in Figs. 1, 3, and 4 the reel may be turned on its axis or stud S by the handle or knob $k$, which is secured to one of the spokes A. The connection end of the hose is secured to the reel by forcing it between the usual hook or lug, $l$, Fig. 4, and the adjacent spoke; or it may be held by simply passing it down between two of the rounds, $r$, of the reel. The latter, being now rotated, winds the hose upon its rounds, and the free end of the hose is secured by bending it over and inserting the end of its nozzle into the nearest of the series of holes or slots O, with which the rim is provided, all as shown in Fig. 2. The elasticity of the hose $h$ causes the nozzle to impinge against the sides of the hole and remain in such position, whence it may be readily released. Now, by simply taking hold of the lever-handle and drawing it over to the right or the left it is quite clear that the reel may be brought to rest upon the ground, as in Fig. 2. The lever being sufficiently depressed so that the base part B will clear the ground, the carriage and hose may be propelled to the desired spot, the reel thus becoming a wheel for that purpose. Again bringing the lever to a vertical position and releasing the nozzle the hose may be unwound.

It will be observed that the holes O in the rim R farthest from the lever are placed near the inner edge or periphery of the rim. The purpose of this is to prevent the projecting extremity of the nozzle from striking the ground when the carriage is wheeled about. Said holes are made in the outer rim—that farthest from the lever—so that the end of the nozzle may not come into contact with the latter.

It is obvious that in all cases the free end of the hose upon the reel must be securely fastened to some part of the latter when the device is to be moved about from place to place. When a rose-sprinkler or other broad-ended nozzle is used I secure the same by means of a hook attached on the end of a band or cord, (elastic preferred,) which is fastened to the nozzle, the hook being caught in one of the holes in the rim of the reel, so as to keep the said band taut. In such case both rims may be provided with holes or slots, preferably alternating in the two rims. Another method of holding the nozzle end is to provide the same with a hook or spring-clasp, whereby to attach it to one of the underlying coils of the hose. Other means for fastening the free end of the hose may be employed; but ordinarily I prefer to make use of the holes in the rims of the reel, as aforesaid.

When the device is designed to carry a hose of considerable length and weight, or the width of the reel is comparatively great, I let into the base B, just beneath the outer rim of the reel, a small pulley, P, as shown, in order to form a support, without much friction, for the reel to turn upon on that side. In this way there is avoided the necessity of sometimes making the lever-standard, the stud S, and the reel so heavy and rigid as would otherwise be required. The pulley P, with its journal, is let into a suitable socket in the base B before the reel is secured in place, and is kept from coming out by the rim of the latter immediately above it.

The lever may be provided with an adjustable hose-clamp, $m$, for holding the nozzle end of the hose when in use. This needs no explanation, as such clamps or holders are in common use with hose-reels of various styles.

I claim—

1. In combination with the single hand-lever L, having the base B extending laterally and transversely therefrom, and the rigid stud S, projecting above the latter, the rimmed reel pivoted on said stud, substantially as and for the purposes specified.

2. In a hose-carriage, the rimmed reel provided with the series of holes $h$, for the purposes specified.

3. In combination with the reel, its standard L, and base B, the pulley P, arranged substantially as and for the purpose specified.

4. In combination with the rimmed reel, the pulley P, let into a socket-bearing in the base B, and held in place by the rim of the reel, as shown and described.

JOSHUA PUSEY.

Witnesses:
    LISLE STOKES,
    JOHN BURKHARDT.